(12) United States Patent
Chang et al.

(10) Patent No.: US 7,605,884 B2
(45) Date of Patent: Oct. 20, 2009

(54) LIQUID CRYSTAL DISPLAY

(75) Inventors: Hak-Sun Chang, Seoul (KR); Eun-Hee Han, Seoul (KR); Chang-Hun Lee, Yongin (KR); Seon-Hong Ahn, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/926,896

(22) Filed: Oct. 29, 2007

(65) Prior Publication Data

US 2008/0129932 A1 Jun. 5, 2008

Related U.S. Application Data

(63) Continuation of application No. 10/702,398, filed on Nov. 5, 2003, now Pat. No. 7,289,179.

(30) Foreign Application Priority Data

Nov. 8, 2002 (KR) .......................... 2002-0069113
Feb. 6, 2003 (KR) .......................... 2003-0007419

(51) Int. Cl.
*G02F 1/13363* (2006.01)
*G02F 1/139* (2006.01)

(52) U.S. Cl. .................. 349/96; 349/118; 349/119; 349/141

(58) Field of Classification Search .............. 349/96, 349/117, 118, 119, 141, 57, 134; 428/1.3, 428/1.31, 1.6; 359/500, 494, 497
See application file for complete search history.

(56) References Cited

U.S. PATENT DOCUMENTS 6,184,961 B1 2/2001 Ham (Continued)

FOREIGN PATENT DOCUMENTS

CN 1252532 5/2000

(Continued)

*Primary Examiner*—Dung Nguyen
*Assistant Examiner*—Tai Duong
(74) *Attorney, Agent, or Firm*—F. Chau & Assoc., LLC

(57) ABSTRACT

A TFT array panel on which both pixel electrodes and common electrodes are formed and a color filter panel is disposed opposing the array panel, and liquid crystals are interposed therebetween. The liquid crystals are aligned parallel to the two panels and driven by parallel electric field formed between the pixel electrodes and reference electrodes. Polarization films are arranged outsides the two panels, and a quasi-A plate compensation film is arranged between the color filter panel and the polarization film. An LCD according to the present invention includes first and second panels, a common electrode formed within the first or the second panel, a pixel electrode formed within the same panel as the common electrode is formed, a liquid crystal layer interposed between the first and second panels, a lower polarization film arranged under the first panel in which the first polarization film is arranged between the first and the second supporting bodies, and an upper polarization film arranged over the second panel in which the second polarization film is arranged between the third and fourth supporting bodies. Yellow shift in black state is also reduced and contrast ratio of side view is improved by minimizing Rth in supporting films or by using TEG polarization film having small Rth.

19 Claims, 10 Drawing Sheets

U.S. PATENT DOCUMENTS

| | | | |
|---|---|---|---|
| 7,042,540 B2 * | 5/2006 | Yano et al. | 349/117 |
| 2001/0000438 A1 | 4/2001 | Kim et al. | |
| 2002/0149726 A1 * | 10/2002 | Yano et al. | 349/117 |

FOREIGN PATENT DOCUMENTS

| | | |
|---|---|---|
| CN | 1275722 | 12/2000 |
| CN | 1339554 | 3/2002 |
| CN | 1374549 | 10/2002 |
| JP | 11133408 | 5/1999 |
| JP | 11202323 | 7/1999 |
| KR | 1020020066874 | 8/2002 |
| KR | 1020020070856 | 9/2002 |
| WO | 9963397 | 12/1999 |

* cited by examiner

LIQUID CRYSTAL DISPLAY

CROSS-REFERENCE TO RELATED APPLICATIONS

This application is a Continuation of U.S. application Ser. No. 10/702,398 filed Nov. 5, 2003, which is now U.S. Pat. No. 7,289,179, which claims priority to Korean Application Nos. 2002-69113 filed on Nov. 8, 2002 and 2003-7419 filed on Feb. 6, 2003. The disclosure of the U.S. application Ser. No. 10/702,398 which is now U.S. Pat. No. 7,289,179, is incorporated by reference herein.

BACKGROUND OF THE INVENTION

1. Field of the Invention

The present invention relates to liquid crystal displays and manufacturing method thereof; more specifically, to liquid crystal displays.

2. Description of the Related Art

A liquid crystal display ("LCD") includes upper and lower panels having field-generating electrodes and a liquid crystal layer interposed therebetween. An electric field is generated in the liquid crystal layer by applying electric voltages to the field-generating electrodes. The intensity of the electric field is adjusted to control the transmittance of light passing through the liquid crystal layer, thereby displaying desired images.

An LCD using horizontal electric field includes a common electrode and a plurality of pixel electrodes as field-generating electrodes which are formed on a panel provided with a plurality of thin film transistors ("TFTs"). The common electrode and the pixel electrode generate electric field parallel to the panels for re-arranging liquid crystal molecules to control the transmittance of light passing through the panels. In addition, a polarizer film is typically disposed on the outer surface of the TFT substrate and the color filter substrate.

A TFT LCD has various advantages such as low power consumption, low voltage drive, lightweight, and thin in thickness, etc. The TFT transistor array panel will generally include thin film transistors, pixel electrodes, gate lines and data lines. The color filter panel, on the other hand will generally include color filters and a common electrode. A gate electrode of a thin film transistor array panel is supplied with a gate-driving signal from a gate driver via a gate line which activates the thin film transistor. A data signal applied to a source electrode of the thin film transistor from a data driver via a data line is supplied to the pixel electrode to switch the LCD pixel of the liquid crystal layer.

One measure of LCD performance is viewing angle and much efforts have been devoted to developing wide viewing angles by various wide viewing angle modes. In one viewing angle mode, In-Plane Switching (IPS) is used. In this mode, two electrodes in each cell are mounted parallel to each other and more freely rotate the liquid crystal molecules to align themselves with the electric field, thereby improving viewing angle. Recently, dual domain IPS mode, which dispenses electrodes in a zigzag-like manner, further improves distribution of electric fields and enables LCDs to display the same color from either right or left sides. The dual domain IPS mode overcame the color distortion causing blue shift on one side and yellow shift on the other side. However, true wide angle has not been achieved because the viewing angle cannot amount to 80° or greater, and it is difficult to display gray color in a black state if there is serious yellow shift. In other words, a horizontal field type LCD displaying a black image shows yellow shift from a side view. This is due to the leakage of green and red light from a side view, which deteriorates the display characteristic such as the visibility or contrast ratio. Moreover, due to the yellow shift, viewing angles is narrower, and color characteristic is not the best condition.

A need therefore exists for an LCD having reduced yellow shift in black using parallel electric field, improved contrast ratio in all directions, enlarged viewing angles, and improved color characteristic.

SUMMARY OF THE INVENTION

According to one embodiment of the present invention, a liquid crystal display device comprises: upper and lower panels facing each other; a liquid crystal layer interposed between the upper and the lower panels; upper and lower polarizer assemblies configured for disposing on outer surfaces of the upper and lower panels; and a retardation film interposed between either the upper panel and the upper polarizer assembly or between the lower panel and the lower polarizer assembly, wherein the retardation film is a quasi A-plate compensation film.

Preferably, the retardation film ranges from about 20 nm to about 100 nm in retardation value. Further, the quasi A-plate compensation film has refractive anisotropy of nx−ny>ny−nz, where nx, ny and nz are refractive indices along x, y, z axes, respectively. The upper and lower panels include a color filter panel and a TFT array panel. The polarizer assembly includes two supporting films, wherein each of the supporting films include a triacetate cellulose (TAC).

According to another aspect of the invention, electrodes are disposed to function in dual domain In Plane Switching (IPS) mode for generating horizontal electric field. According to another aspect of the invention, the polarizer assembly includes a light recycling film such as DBEF-D film, Bepol, or Nipocs.

According to another embodiment of the present invention, a liquid crystal display device comprises: upper and lower panels facing each other; a liquid crystal layer interposed between the upper and the lower panel; upper and lower polarizer assemblies configured for disposing on outer surfaces of the panels; and supporting films disposed on both upper and lower surfaces of each polarization film, wherein two supporting films facing the panels comprise Ro of 0 nm and Rth of 0 to about 50 nm.

According to another aspect of this embodiment, liquid crystals in the liquid crystal layer are substantially aligned tilted from a long axis at about 2 to about 5 degrees, the long axis being normal to gate lines. A quasi A-plate compensation film is interposed between either the upper panel and the upper polarizer assembly or between the lower panel and the lower polarizer assembly.

According to another embodiment of the present invention, a liquid crystal display device comprises: upper and lower panels facing each other; a liquid crystal layer interposed between the panels; pre-tilt liquid crystals disposed in the liquid crystal layer; and a pair of polarizer assemblies configured for disposing on outer surfaces of the panels.

Thus, the present invention provides for liquid crystal display devices having improved contrast ratios and reduced yellow shift. This is achieved by interposing a retardation film between a panel and a polarizer assembly or by disposing supporting films having Ro of 0 nm and Rth of 0 to about 50 nm on polarization films. This is also achieved by having a pre-tilt angle of the first and the second alignment films formed inside the panels.

BRIEF DESCRIPTION OF THE DRAWINGS

These and other features of the present invention may be better and more completely understood by studying the following detailed description of the presently preferred embodiments together with the drawings, of which.

DETAILED DESCRIPTION OF PREFERRED EMBODIMENTS

Figure 1:
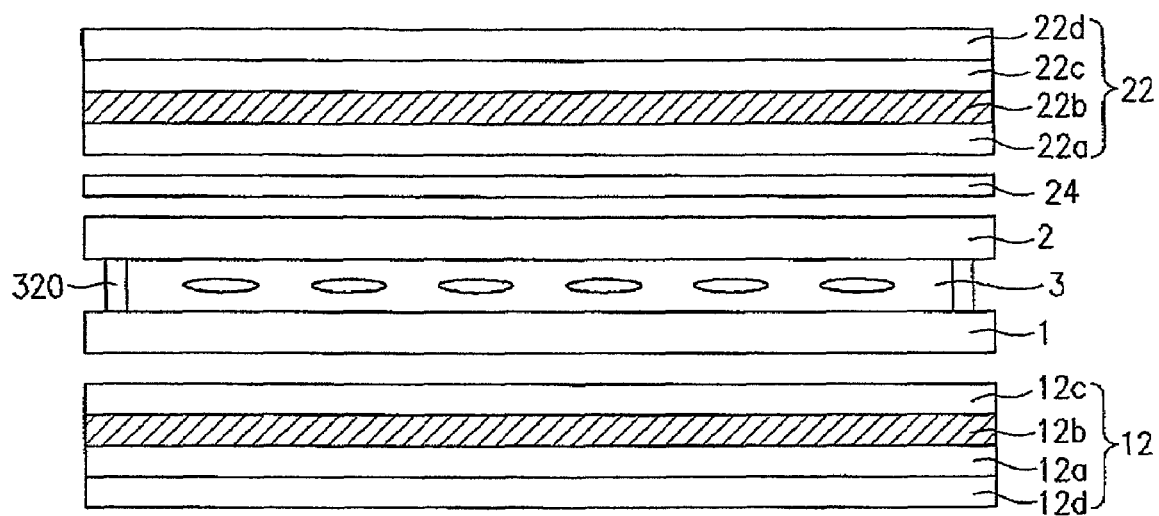
FIG. 1 is a sectional view of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

The LCDs according to embodiments of the present invention will be described with reference to the drawings.

Figure 2A:
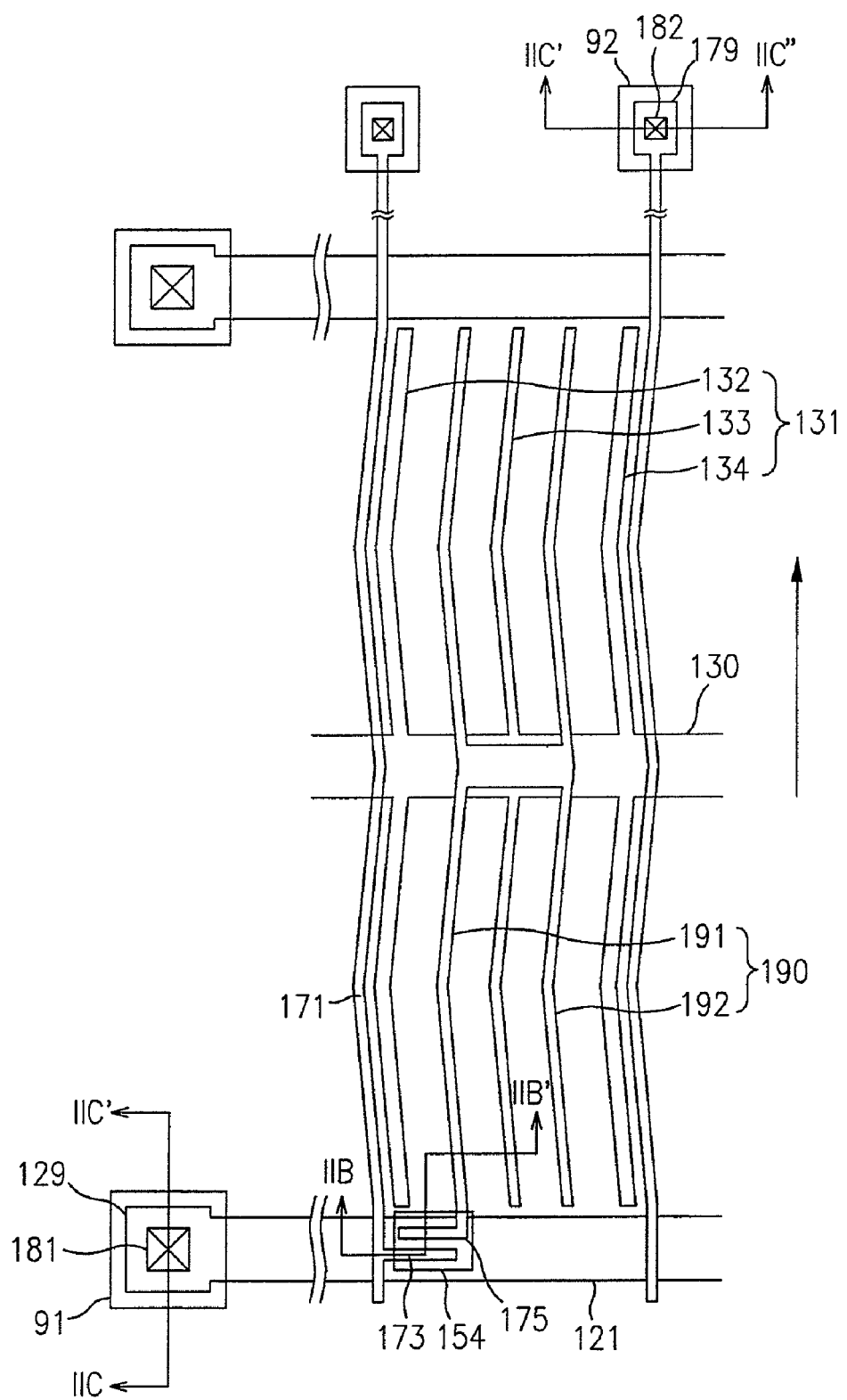
FIG. 2A is a layout view of a TFT array panel for an LCD according to an embodiment of the present invention.
Figure 2B:
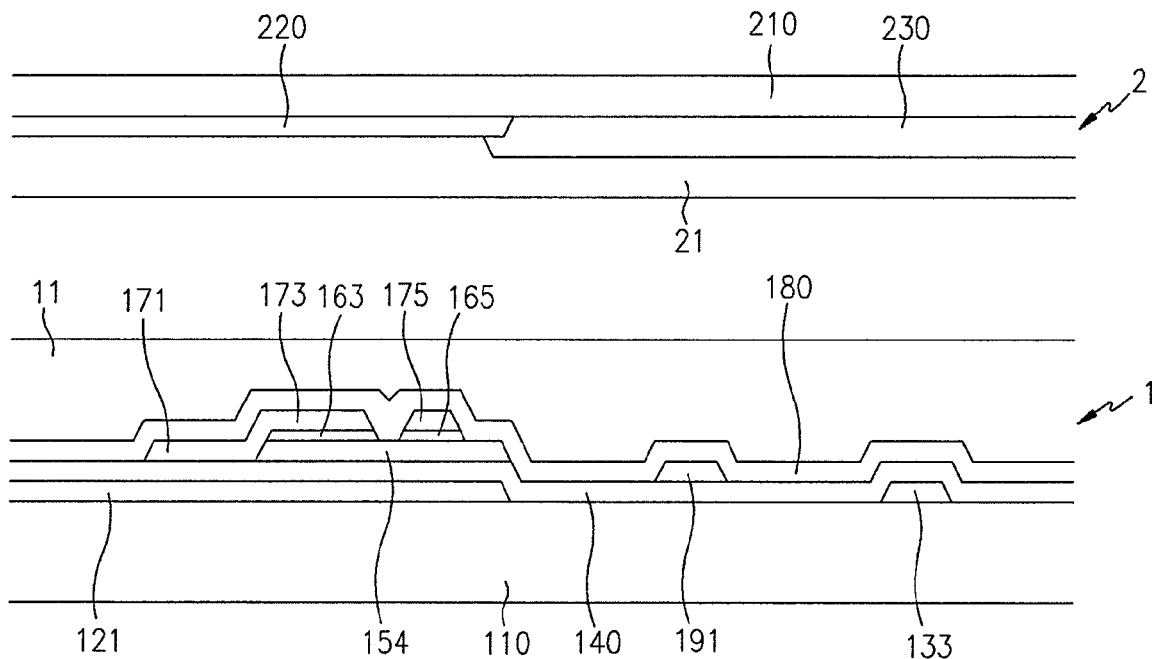
FIGS. 2B and 2C are sectional views of the TFT array panel shown in FIG. 2A, taken along lines IIB-IIB' and IIC-IIC' and IIC'-CC", respectively.
Figure 2C:
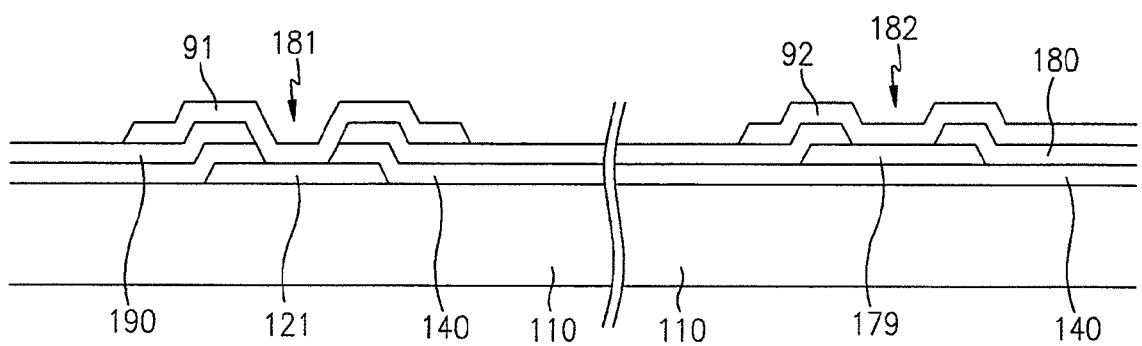
Figure 3A:
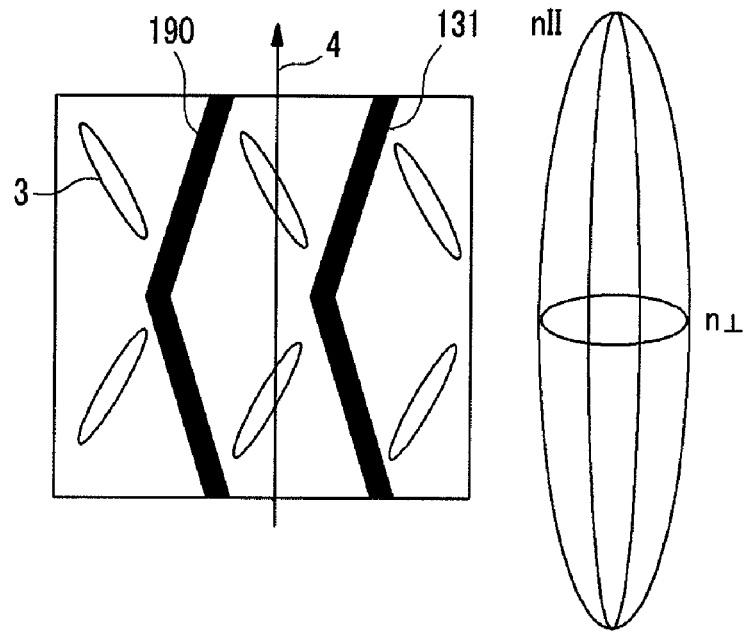
FIGS. 3A and 3B are schematic diagrams showing arrangement of slow axis of a compensation film and rubbing direction of an LCD according to a first embodiment of the present invention.
Figure 3B:
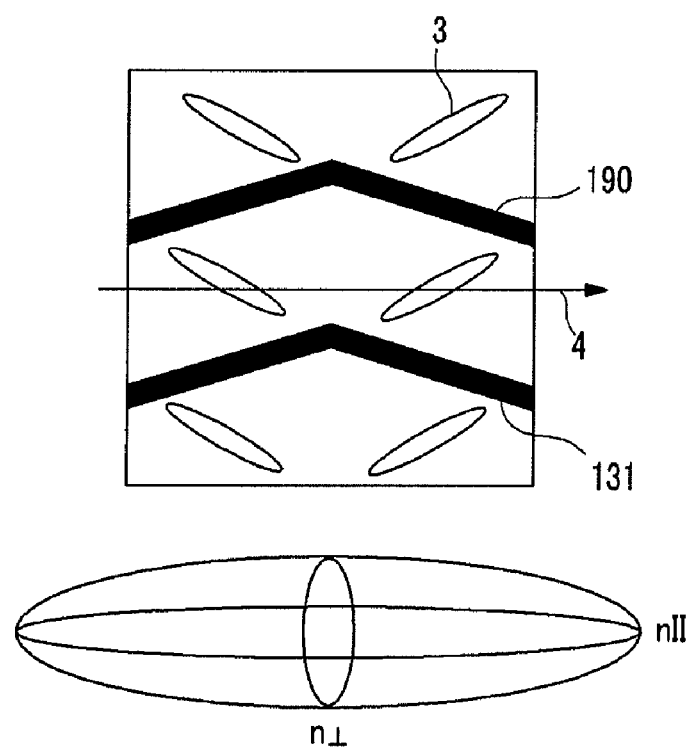

FIG. 1 is a sectional view of an LCD according to an embodiment of the present invention, FIG. 2A is a layout view of a TFT array panel for an LCD according to an embodiment of the present invention, and FIGS. 2B and 2C are sectional views of an LCD including the TFT array panel shown in FIG. 2A taken along the lines IIB-IIB' and IIC-IIC' and IIC'-CC", respectively. FIGS. 3A and 3B are schematic diagrams showing arrangement of slow axis of a compensation film and rubbing direction of an LCD according to the first embodiment of the present invention.

An LCD according to an embodiment of the present invention includes a TFT array panel 1, a color filter panel 2 facing the TFT array panel 1, a sealant 320 for sealing the liquid crystal layer 3 and creating a gap between the panels 1 and 2, and a liquid crystal layer containing a plurality of liquid crystal molecules 3 disposed in the gap between the panels 1 and 2. The LCD further includes a pair of polarizer assembly 12 and 22 disposed on outer surfaces of the panels 1 and 2, respectively, and a retardation film 24 inserted between the color filter panel 2 and the polarizer assembly 22.

Referring to FIGS. 2A to 2C, the TFT array panel 1 includes a plurality of gate lines 121, a plurality of common electrode wires 130, a gate insulating layer 140 covering the gate lines 121, a plurality of semiconductor islands 154 formed on the gate insulating layer 140 over the gate electrodes, a plurality of ohmic contacts 163 and 165, a plurality of data lines 171, a plurality of drain electrodes 175 opposing the source electrodes 173, a plurality of pixel electrodes 190, a passivation layer 180 covering and protecting the semiconductor islands 154, a plurality of contact assistants 91 and 92, and an alignment layer 11 formed on an insulating substrate 110.

Each gate line 121 for transmitting a gate signal includes a plurality of gate electrodes, and each data line 171 for transmitting data voltages includes a plurality of source electrodes 173 opposite the drain electrodes 175 with respect to the gate electrodes. One gate electrode, one source electrode 173 and one drain electrode 175 along with one semiconductor island 154 form a TFT, which transmits the data voltages in response to the gate signal. The semiconductor island 154 is disposed adjacent to other semiconductor islands as shown.

Each common electrode wire 130 is located on the same layer as the gate lines 121 and disposed between adjacent two of the gate lines 121. The common electrode wire 130 is supplied with a common voltage and includes a plurality of common electrodes 131 connected to each other. Each common electrode 131 includes a plurality of branches 132-134 extending upward and downward like a comb.

Each pixel electrode 190 is connected to one of the drain electrodes 175 and includes a plurality of branches 191 and 192 extending upward and downward like a comb. The branches 132-134 of the common electrode 131 and the branches 191-192 of the pixel electrode 190 are alternately arranged and extend substantially parallel to each other such that they generate an electric field substantially parallel to the panels 1 and 2 upon the application of voltages with different magnitudes.

According to a preferred embodiment of the present invention, the pixel electrodes 190 and the common electrodes 131 are formed in a zigzag-like pattern, having bents or angles at predetermined lengths as shown in FIG. 2A. Such bents or angular characteristics are the same for all electrodes, essentially parallel to data line 171. Therefore, the pixel electrodes 190 and the common electrodes 131 are also parallel to each other. If a potential difference is applied between the pixel electrodes 190 and the common electrodes 131, electric field that is horizontally distributed and parallel to the two panels 1 and 2 (FIG. 1) is formed to rearrange the liquid crystal molecules.

The gate insulating layer 140 covers the gate lines 121 except for end portions 129 thereof and the common electrode wire 130, and the semiconductor islands 154 are located on the gate insulating layer 140. The ohmic contacts 163 and 165 are interposed between the semiconductor islands 154 and the data lines 171 and between the semiconductor islands 154 and the drain electrodes 175, respectively, to reduce the contact resistance therebetween.

The passivation layer 180 covers the data lines 171 except for end portions 179 thereof, the drain electrodes 175, the pixel electrodes 190, and the semiconductor islands 154.

The contact assistants 91 and 92 are connected to the exposed end portions 129 and 179 of the gate lines 121 and the data lines 171 through contact holes 181 and 182 provided at the gate insulating layer 140 and the passivation layer 180, respectively, for protecting the exposed end portions 129 and 179 and complementing the adhesion of the TFT array panel 1 and driving ICs therefore.

The gate lines 121 and the data lines 171 intersect each other to define a plurality of closed areas arranged in a matrix. A pair of a pixel electrode 190 and a common electrode 131 is provided in each closed area.

The data lines 171, the common electrodes 131 and the pixel electrodes 190 are disposed parallel to each other and have angular bents at predetermined lengths as shown in FIG. 2A, preferably at about midpoint of each closed area.

Although the embodiment of the present invention is described with a dual domain type IPS, one skilled in the art can readily appreciate that the embodiment can be applicable to a conventional IPS type LCD.

The color filter panel 2 includes a black matrix 220 and a plurality of color filters 230, and an alignment layer 21 formed on an insulating substrate 210. The black matrix 220 has a plurality of openings facing the closed areas arranged in a matrix, and each color filter 230 is placed in an opening of the black matrix 220 and used as one of three primary colors, such as red, green and blue. According to another embodiment of the present invention, the color filters 230 can be provided on the TFT array panel 1 instead of the color filter panel 2. The liquid crystal molecules 3 are arranged such that their major axes are aligned substantially parallel to the panels 1 and 2 and substantially perpendicular to the gate lines 121 (for example, in a direction indicated by an arrow 4 shown in FIGS. 2A and 3) in absence of an electric field, and such an arrangement is obtained by rubbing the alignment layers 11 and 21 along the arrow 4. The liquid crystal molecules 3 rotate upon the application of an electric field and the rotation angle depends on the field strength.

Referring to FIG. 1, each of the polarizer assembly 12 or 22 includes a polarization film 12b or 22b, two supporting films 12a and 12c; or 22a and 22c attached to both surfaces of the polarization film 12b or 22b. Each polarizer assembly 12 or 22 may further include a light recycling film (not shown) combined with the polarization film 12b or 22b. The light recycling film preferably includes a commercially available DBEF-D film, Bepol, or Nipocs.

The polarization films 12b and 22b have crossed absorbing axes (or transmitting axes), and the absorbing axis of one of the polarization films 12b and 22b is parallel to the major axes of the liquid crystal molecules 3 (or the liquid crystal director) in their initial alignment.

The supporting films 12a, 12c, 22a and 22c preferably include triacetate cellulose (TAC) films.

According to embodiments the present invention, a retardation film 24 is disposed between color filter panel 2 and polarizer assembly 22. The retardation film preferably includes a quasi A-plate uniaxial compensation film having refractive anisotropy such that nx−ny>ny−nz where nx, ny and nz are refractive indices along x, y and z axes, respectively, when the z axes is defined to be normal to the surface of the film. A regular A-plate compensation film has refractive indices expressed as nx>ny or nz, and ny=nz. The quasi A-plate compensation film is preferred because it reduces the side yellow shift problem in black state by compensating the birefringence effects on a display.

Referring to FIGS. 3A and 3B, the quasi A plate compensation film 24 is disposed such that its slow axis $n_\parallel$ (i.e., x axis along which the refractive index is largest) is parallel to the initial direction of the liquid crystal director, where $n\perp$ is an axis (e.g. y axis) perpendicular to the slow axis $n_\parallel$. FIGS. 3A and 3B show that the liquid crystal molecules 3 have rotated from their initial orientations due to an electric field generated by the electrodes 190 and 131. The retardation defined as ((nx−ny)×(film thickness)) of the compensation film 24 has a value in a range between about 20 nm and about 100 nm.

According to another embodiment of the present invention, the retardation film 24 is inserted between the TFT array panel 1 and the polarizer assembly 12.

Figure 4A:
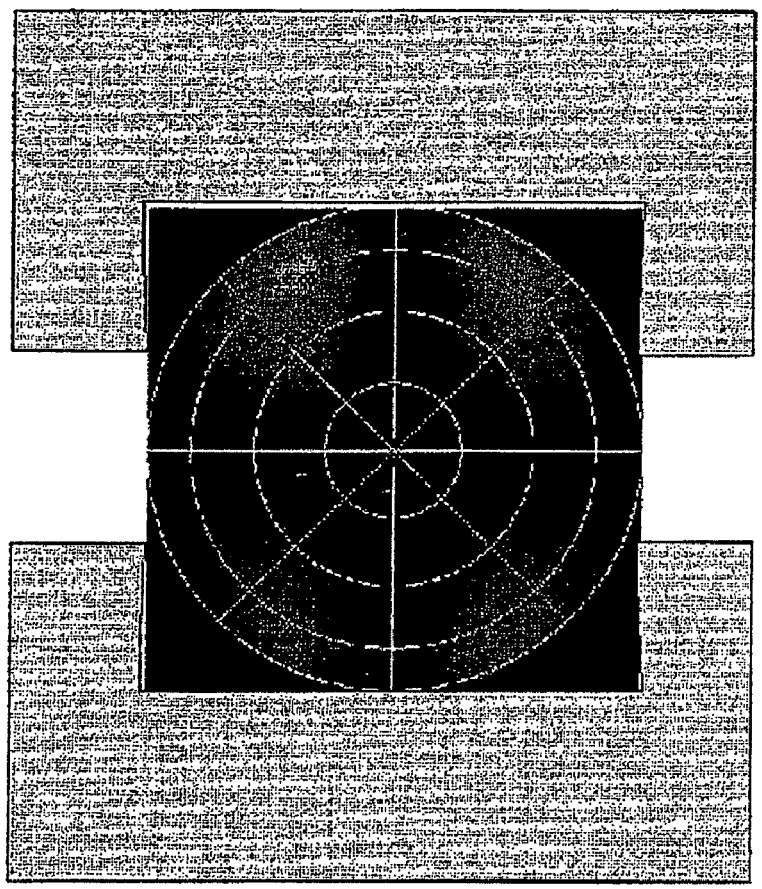
FIGS. 4A and 4B are images measured by an optical measuring instrument showing the difference of yellow shift between the case without a quasi A-plate compensation film and the case in which a quasi A-plate compensation film is applied according to an embodiment of the present invention.
Figure 4B:
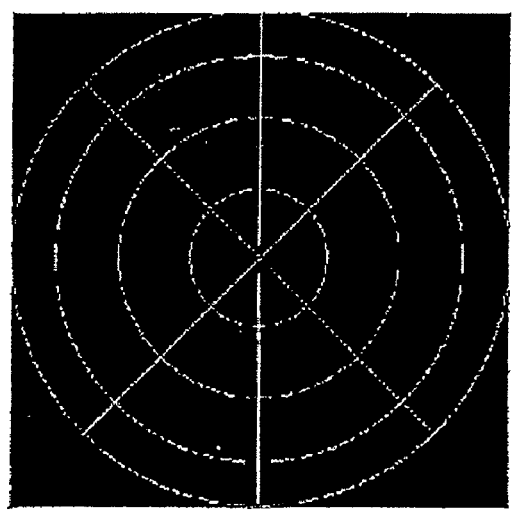

FIGS. 4A and 4B are images measured by an optical measuring instrument (Cono-scope: product name) showing the difference of yellow shift between the case without A plate compensation film and the case in which quasi A-plate compensation film is applied according to the present invention.

As shown in FIG. 4A, when a quasi A-plate compensation film is not applied, there is a severe yellow shift when the LCD panel is viewed from an upper diagonal direction. However, as can be seen in FIG. 4B, wherein a quasi A-plate compensation film is applied according to the present invention, an excellent black color can be seen without yellow shift.

Figure 5A:
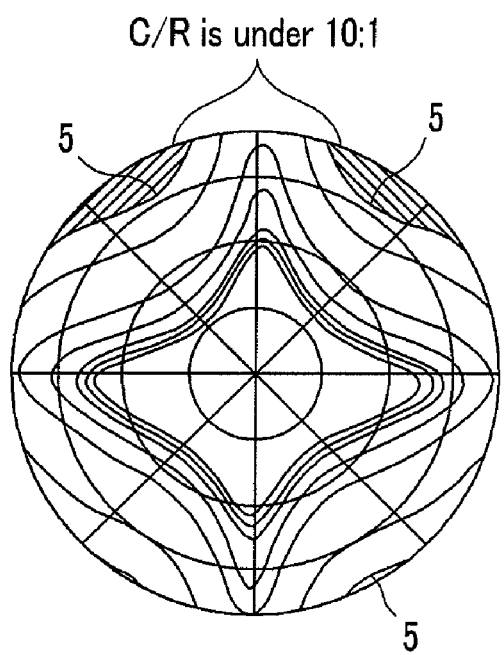
FIGS. 5A and 5B are graphs showing isocontrast curves of an LCD without and with a quasi A-plate compensation film, respectively.
Figure 5B:
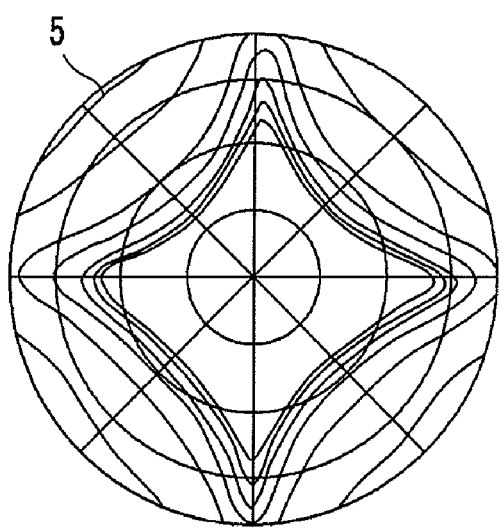

FIGS. 5A and 5B are graphs showing isocontrast curves of an LCD without and with a quasi A-plate compensation film, respectively. The vertical axis indicates a polar angle measured from a vertical axis on a screen of the LCD and the horizontal axis indicates an azimuthal angle measured from an axis normal to the screen. The concentric circles are spaced apart by 20 degrees. The reference numeral 5 indicates the isocontrast curve for the contrast ratio of 10:1, and the hatched areas indicate the areas with the contrast ratio less than 10:1.

As shown in FIG. 5A, the contrast ratio for the LCD without the compensation film falls under 10:1 when the viewing angle exceeds 60 degrees in upper left and upper right directions. However, the LCD with the compensation film maintains a good contrast ratio larger than 10:1 in all directions, as shown in FIG. 5B.

Figure 6A:
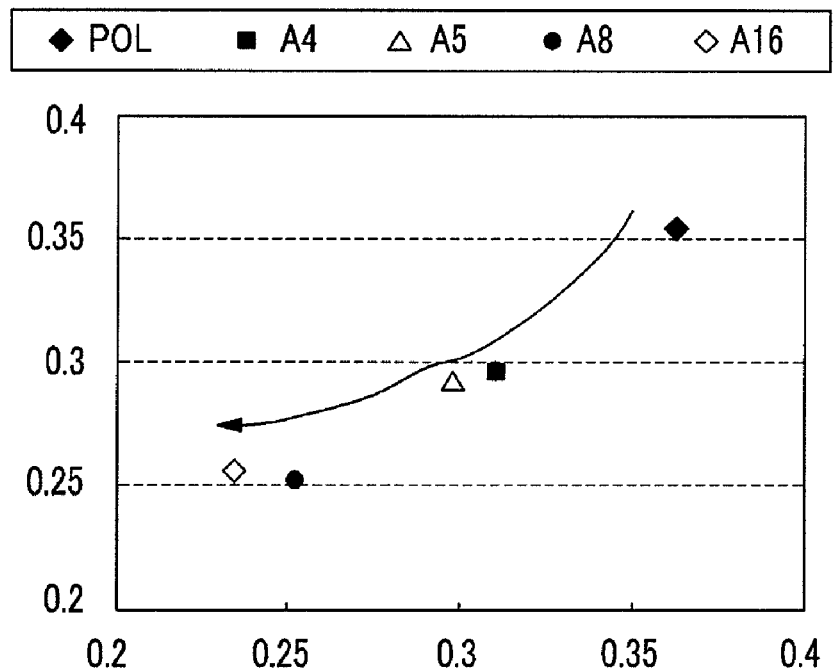
FIGS. 6A and 6B are graphs respectively showing color coordinates at viewing positions where the polar angle and the azimuthal angle are (60 degree, 40 degree) and (60 degree, 60 degree), respectively.
Figure 6B:
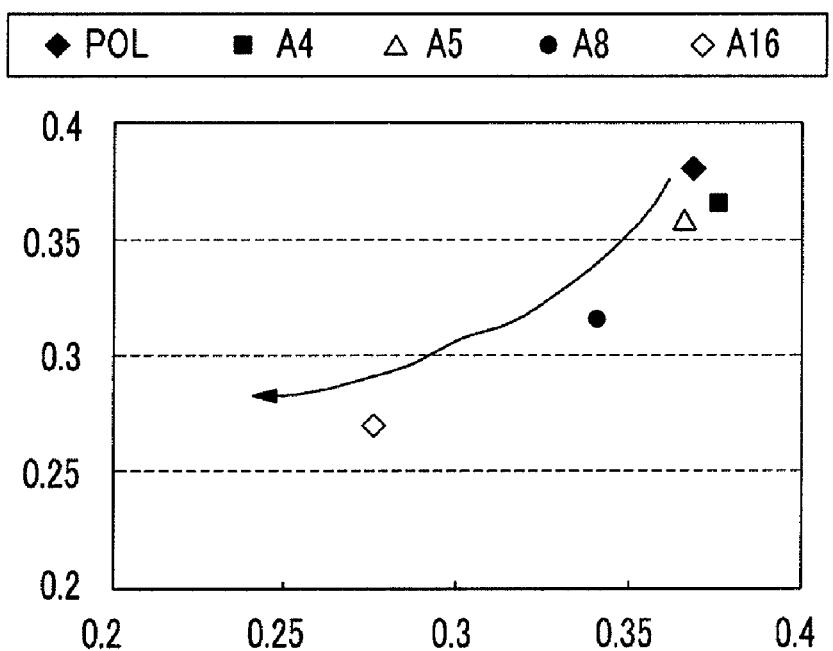

FIGS. 6A and 6B are graphs showing color coordinates (CIE chromaticity coordinates) at viewing positions where the polar angle and the azimuthal angle are (60 degree, 40 degree) and (60 degree, 60 degree), respectively. The red chromaticity coordinate is given by x and the green chromaticity coordinate by y. Conventionally, the upper right portion of the graph represents yellow shift and the lower left portion of the graph represents blue shift. In FIGS. 6A and 6B, the coordinates for an LCD without a quasi A-plate compensation film is indicated by a label POL, and the coordinates for an LCD with a quasi A-plate compensation film having a retardation value of 40 nm, 50 nm, 59 nm and 107 nm are represented by reference labels A4, A5, A8 and A16, respectively.

As shown in FIGS. 6A and 6B, the color coordinate POL for the LCD without a quasi A-plate compensation film shows the yellow shift even in black state. The color coordinates A4, A5, A8 and A16 for the LCD with the quasi A-plate compensation film move toward blue shift, e.g., the color coordinates become closer to blue as the retardation value of the quasi A-plate compensation film becomes larger. However, the color coordinate becomes blue color if the retardation value is too large, the retardation value of the quasi A-plate compensation film is carefully chosen. If it is found that the blue shift becomes visible when the retardation value exceeds about 100 nm, and there exists certain levels of yellow shift when the retardation value is less than about 20 nm. Therefore, it is preferable that the retardation value of the quasi A-plate compensation film ranges from about 20 nm to about 100 nm.

Now, a liquid crystal display according to another embodiment of the present invention will be described with reference to FIG. 7 of the drawings.

Figure 7:
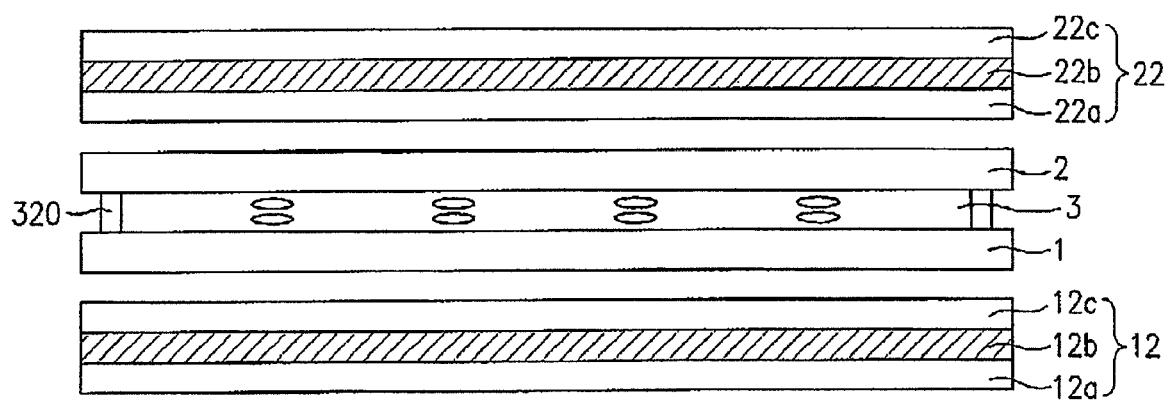
FIG. 7 is a sectional view of an LCD according to another embodiment of the present invention.

FIG. 7 is a sectional view of an LCD according to another embodiment of the present invention. As shown in FIG. 7, an LCD according to this embodiment of the present invention includes a TFT array panel 1, a color filter panel 2 facing the TFT array panel 1, a sealant 320 sealing the liquid crystal layer 3 and creating a gap between the panels 1 and 2, and a liquid crystal layer 3 containing liquid crystal molecules disposed in the gap between the panels 1 and 2. The LCD further includes a pair of polarizer assembly 12 and 22 disposed on outer surfaces of the panels 1 and 2, respectively.

The TFT array panel 1 and the color filter panel 2 preferably have the structures shown in FIGS. 2A to 2C.

According to this embodiment, each of the polarizer assembly 12 or 22 includes a polarization film 12b or 22b, two supporting films 12a and 12c; or 22a and 22c attached to both surfaces of the polarization film 12b or 22b. The films 12a-12c and 22a-22c provide phase retardation to expand the viewing angle or to resolve a gray scale inversion problem.

The horizontal retardation (Rh or Ro) values indicating the degree of phase retardation of such thin films in a direction parallel to the surface of the film can be expressed as:

$$Rh = (Nx - Ny) \times d \quad (1)$$

Or $$Ro = (Nx - Ny) \times d \quad (1)'$$

where d is a thickness of the thin film, and Nx and Ny are refractive indices in a direction parallel to the gate line and in a direction perpendicular to the gate line, respectively.

The vertical retardation (Rv) of a thin film in a direction perpendicular to the surface of the film is given by:

$$Rv = \left(\frac{Nx + Ny}{2} - Nz\right) \times d \quad (2)$$

where Nz is a refractive index in a direction perpendicular to the surface of the film. Theoretically, the supporting films 12a, 12c, 22a and 22c have certain vertical retardations (Rv) but have no horizontal retardation (Rh). However, since it is difficult to manufacture the first through fourth supporting films having zero (0) Rh, it is preferred that the first through fourth supporting films be manufactured to have Rh of 0 nm to about 5 nm. Thus, it is apparent that the supporting films 12c and 22a contribute to the display characteristic of the LCD.

The phase retardation in thickness (Rth) is given by:

$$Rth = \left(\frac{Nx + Ny}{2} - Nz\right) \times d \quad (2)'$$

where Rth indicates phase retardation in thickness direction of the thin film, and Nz is a refractive index of vertical direction of molecules forming the thin film. In general, the Rth of a thin film has characteristics of compensating retardation of light from slanted liquid crystals. However, in a horizontal electric field LCD, the liquid crystals are not slanted. Therefore, Rth of the thin film produces reverse effects. That is, the liquid crystals do not produce retardation of light but the thin film produces retardation of light. This induces light leakage.

When the retardation produced by the thin film is larger than the retardation produced by the liquid crystals, there is yellow shift in black state. Therefore, yellow shift in black state can be reduced by minimizing Rths of the second and third supporting films (22a, 22c).

Yellow shift in black state can be observed from a side view using Triethylgallium (TEG) polarization film, which is commonly used as a thin film for notebook computers. Yellow shift in black state is also observed from a side view in the case of additional TAC films arranged between the second and third supporting films and the two panels of the LCD. A Selective Epitaxial Growth (SEG) polarization film is a conventional polarization film having Rth of 50-60 nm, while a TEG polarization film has a smaller Rth.

Figure 8:
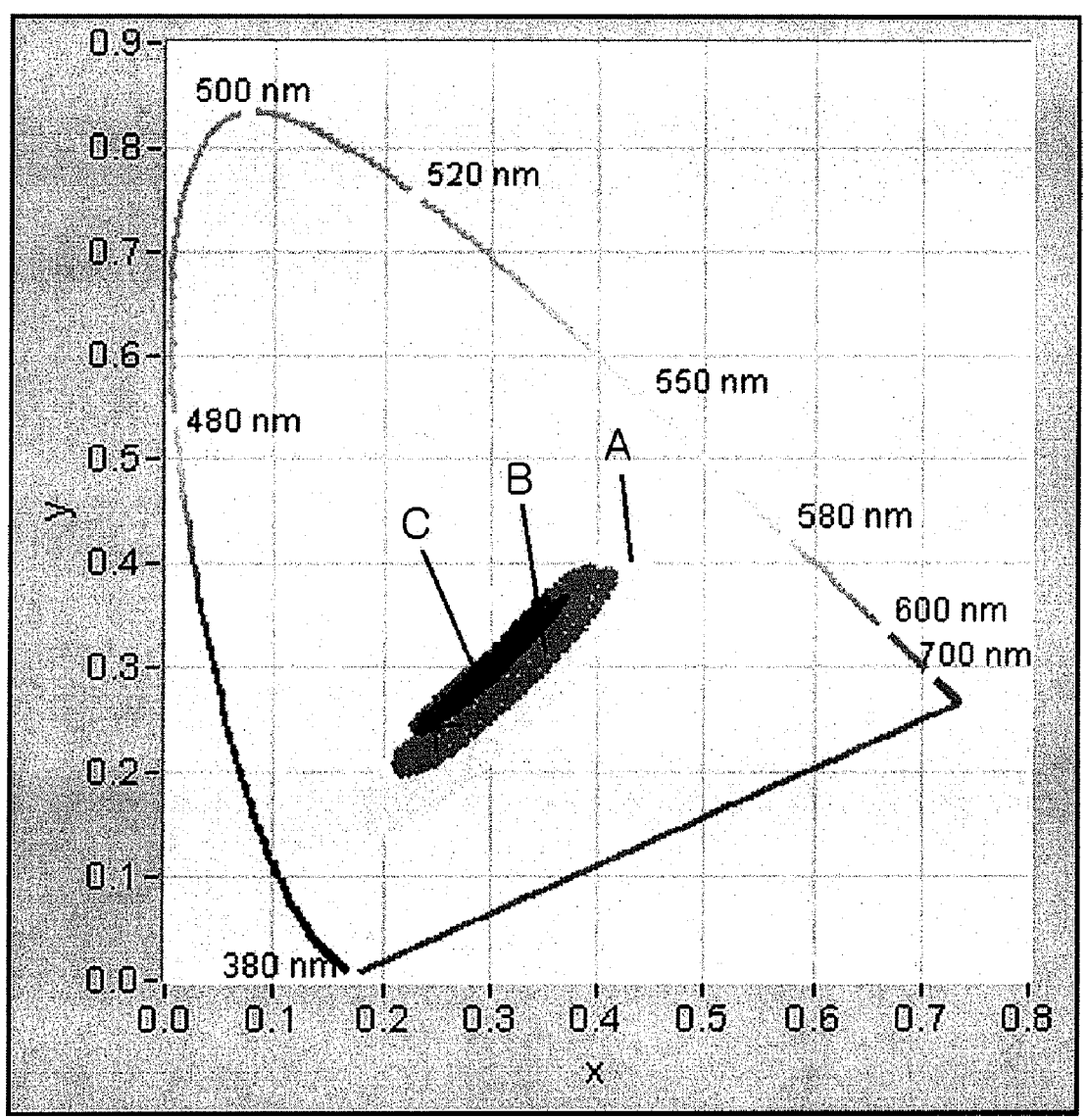
FIG. 8 is a graph showing color coordinates in a CIE coordinate system for an LCD having various polarization films and displays a black image.

In FIG. 8, area A of the CIE coordinate system shows yellow shift in black state when additional TACs are disposed on SEG polarization films, and area B shows yellow shift in black state when only SEG polarization films are used. Area C shows yellow shift in black state when only TEG polarization films are used.

As shown in FIG. 8, there is more yellow shift when more TACs are present in SEG polarization films while the yellow shift is reduced when TEG polarization film having small Rths are used.

Therefore, if thin films having smaller Rth than that of TEG polarization films are used, yellow shift in black state from a side view can be much improved.

According to an embodiment of the present invention, it is preferred that Ro and Rth of the second and third supporting films are respectively 0 nm and 0 to about 50 nm.

Figure 9:
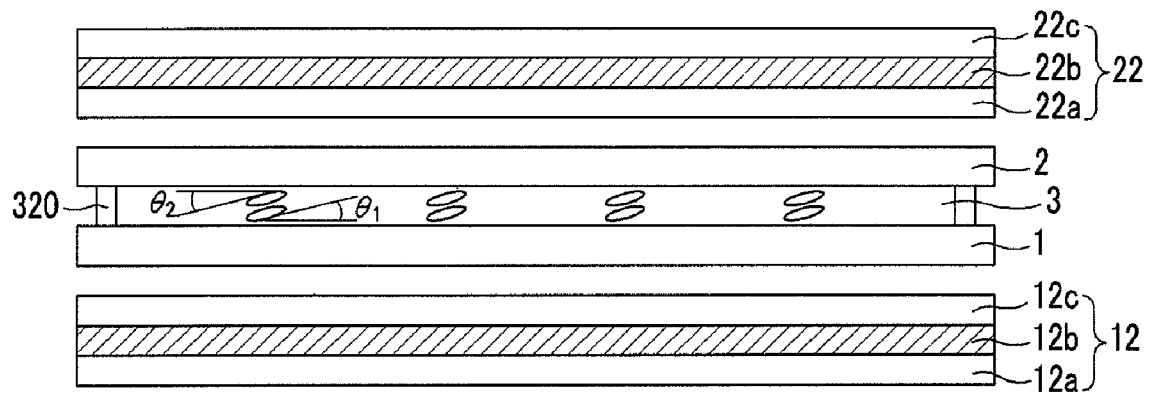
FIG. 9 is a sectional view of an LCD according to still another embodiment of the present invention.

An LCD according to another embodiment of the present invention is shown in FIG. 9. The reference numerals in FIG. 9 that are the same as in the above-described drawings indicate same elements having same functions as described for the previous drawings.

As shown in FIG. 9, an LCD includes a TFT array panel 1 and a color filter panel 2 facing each other, a liquid crystal layer 3 interposed between the two panels 1 and 2, first and second polarization films 12b and 22b arranged on outer sides of the two panels 1 and 2, and first through fourth supporting films 12a, 12c, 22a, and 22c which are supporting bodies of the first and second polarization films 12b and 22b.

The TFT array panel 1 may be described more precisely with reference to the FIGS. 2a to 2c. A plurality of gate lines 121, data lines 171, TFTs, pixel electrodes 190, and common electrode wires 130 are formed on the TFT array panel 1 as shown in FIGS. 2a to 2c. The gate lines 121 and data lines 171 intersect each other to define a plurality of pixel areas arranged in a matrix. In each pixel area, a TFT, pixel electrode 190, and common electrode 131 are provided.

If a voltage potential difference is applied between the pixel electrodes 190 and common electrodes 131, electric field parallel to the two panels 1 and 2 is formed to re-arrange the liquid crystals.

A black matrix, color filters, etc. are formed on the color filter panel 2. The black matrix defines pixel areas in a matrix pattern, and red, green, and blue color filters are formed in each pixel area. The color filters can be formed on the TFT array panel 1 instead of the color filter panel 2.

Liquid crystal molecules in the liquid crystal layer 3 are arranged so that their long axis are perpendicular to the gate lines 121 (arrow direction in FIG. 2a), and such an arrangement is obtained by rubbing alignment layers (not shown) formed on the two panels 1 and 2 to the arrow direction of FIG. 2a.

The first polarization film 12b and the second polarization film 22b can be made by combining a polarization film and a light recycling film. A DBEF-D film, Bepol, or Nipocs can be used as a light recycling film. Absorbing axes (or transmitting axes) of the two polarization films 12b and 22b are arranged to be perpendicular to each other when a front view thereof is taken, and one of the two absorbing axes of the two polarization films 12b and 22b is arranged to be parallel to the long axis of the liquid crystals. Preferably, TAC (triacetyl cellulous) is used for the first through fourth supporting films.

In general, Rth of a thin film has a function of compensating retardation of light which is retarded by slanted liquid crystals. However, in the parallel electric field LCD, the liquid crystals are not slanted. Therefore, Rth of the thin film produce reverse effects. That is, the liquid crystals do not produce retardation of light but the thin film produce retardation of light. This induces light leakage.

When the retardation produced by the thin film is larger than the retardation produced by the liquid crystal, yellow shift occurs in black state. Therefore, the yellow shift in black state can be improved if liquid crystal is slanted in a parallel electric field LCD to compensate Rth of TAC used for conventional polarization film. Generally, pre-tilt angle of alignment layer of a horizontal electric field LCD is about 1 to about 2 degree. Therefore, yellow shift problem in black state when viewed from a side due to the remaining Rth of TAC can be resolved by using alignment layers having slightly larger pre-tilt angle.

It is preferable that Ro and Rth of the second and third supporting films are 0 nm and about 50 to about 70 nm, respectively, and both the first and second slant angles are about 2 to about 5 degrees, when it is assumed that phase retardation in horizontal direction is Ro, Rth is thickness direction, the angle between the first panel and the long axis of the liquid crystals is the first angle θ1, and the angle between the second panel and the long axis of the liquid crystals is the second angle θ2.

Since it is difficult to manufacture the first through fourth supporting films having zero retardation in Ro, it is preferable that the first through fourth supporting films be manufactured to have Ro of 0 nm to about 5 nm.

Preferably, the first and second alignment films formed on the first and second panels are formed to have about 2 to about 5 degree of pre-tilt angle.

As described above, yellow shift in black state can be reduced and contrast ratio of side view can be improved by applying a quasi A-plate compensation film to an LCD using horizontal electric field according to the present invention. Direct benefits are enlargement of viewing angle and improvement of color characteristics.

Also, yellow shift in black state can be reduced and contrast ratio of side view can be improved by applying upper and lower polarization films that make phase retardation in thickness direction smaller. Further, yellow shift can be reduced by minimizing Rth in the supporting films.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A liquid crystal display device, comprising:
upper and lower panels facing each other;
a first field generating electrode formed on the lower panel;
a second field generating electrode formed on the lower panel to generate an electric field with the first field generating electrode;
a liquid crystal layer interposed between the upper and the lower panels;
a first polarizer assemblies disposed on outer surface of the upper panel; and
a second polarizer assemblies disposed on outer surface of the lower panel,
wherein liquid crystal molecules of the liquid crystal layer are horizontally aligned when there are no electric fields,
wherein the liquid crystal device controls liquid crystal molecules of liquid crystal layer using a horizontal component of the electric field,
wherein at least one of the first and second polarizer assemblies comprise a polarization film, first and second supporting films disposed on both surfaces of the polarization film respectively, and
wherein at least one of the first and second supporting films have Rth of 0 to 50 nm and Ro of 0 nm to 5nm.

2. The liquid crystal display device of claim 1, wherein the liquid crystal molecules are arranged having about 1 to about 5 degree of pre-tilt angle.

3. The liquid crystal display device of claim 2, wherein the absorbing axes of two polarization films are arranged to be perpendicular to each other, and one of the two absorbing axes of polarization films is arranged to be parallel to the initial direction of liquid crystal director.

4. The liquid crystal display device of claim 3, wherein at least one of the first and second polarizer assemblies comprise a compensation film, and the slow axis of the compensation film is substantially parallel to the initial direction of liquid crystal director.

5. The liquid crystal display device of claim 4, wherein the slow axis of the compensation film is neither parallel nor perpendicular to the extending direction of the first and second field generating electrodes.

6. The liquid crystal display device of claim 5, wherein the horizontal retardation of the compensation film has a value in a range between about 20 nm and about 100 nm.

7. The liquid crystal display device of claim 6, wherein the compensation film is a quasi A-plate, wherein the quasi A-plate has refractive anisotropy of nx−ny>ny−nz, where nx, ny and nz are refractive indices along x, y and z axes, respectively.

8. The liquid crystal display device of claim 7, wherein at least one of the first and second polarizer assemblies further includes a light recycling film.

9. The liquid crystal display device of claim 8, wherein the supporting film comprises a triacetate cellulose (TAC).

10. The liquid crystal display device of claim 9, wherein the polarization film comprises Triethylgallium(TEG).

11. The liquid crystal display device of claim 3, wherein the first field generating electrode nd the second field generating electrode are alternatively arranged each other.

12. The liquid crystal display device of claim 11, wherein the first field generating electrode and the second field generating electrode are formed in a zigzag pattern.

13. The liquid crystal display device of claim 12, wherein at least one of the first and second polarizer assemblies comprise a compensation film, and the slow axis of the compen sation film is substantially parallel to the initial direction of liquid crystal director.

14. The liquid crystal display device of claim 13, wherein the slow axis of the compensation film is neither parallel nor perpendicular to the extending direction of the first and second field generating electrodes.

15. The liquid crystal display device of claim 14, wherein the horizontal retardation of the compensation film has a value in a range between about 20 nm and about 100 nm.

16. The liquid crystal display device of claim 15, wherein the compensation film is a quasi A-plate, wherein the quasi A-plate has refractive anisotropy of nx−ny>ny−nz, where nx, ny and nz are refractive indices along x, y and z axes, respectively.

17. The liquid crystal display device of claim 16, wherein at least one of the first and second polarizer assemblies further includes a light recycling film.

18. The liquid crystal display device of claim 17, wherein the supporting film comprises a triacetate cellulose (TAC).

19. The liquid crystal display device of claim 18, wherein the polarization film comprises Triethylgallium (TEG).

* * * * *